(12) United States Patent
Aoyama et al.

(10) Patent No.: US 7,421,313 B2
(45) Date of Patent: Sep. 2, 2008

(54) ROBOT APPARATUS AND CONTROL METHOD THEREOF

(75) Inventors: Kazumi Aoyama, Saitama (JP); Hideki Shimomura, Kanagawa (JP); Shoichi Ikenoue, Chiba (JP)

(73) Assignee: Sony Corporation, Tokyo (JP)

( * ) Notice: Subject to any disclaimer, the term of this patent is extended or adjusted under 35 U.S.C. 154(b) by 647 days.

(21) Appl. No.: 10/781,480

(22) Filed: Feb. 18, 2004

(65) Prior Publication Data

US 2004/0225410 A1 Nov. 11, 2004

(30) Foreign Application Priority Data

Feb. 19, 2003 (JP) ............... 2003-041832

(51) Int. Cl.
*G06F 19/00* (2006.01)
(52) U.S. Cl. .............. 700/245; 700/250; 700/258; 700/259; 901/1; 706/45
(58) Field of Classification Search ............. 901/3, 901/1; 700/245, 250, 258, 259; 706/45, 706/46, 47, 62
See application file for complete search history.

(56) References Cited

U.S. PATENT DOCUMENTS 6,035,243 A * 3/2000 Galuga et al. ............... 700/110
6,732,016 B2 * 5/2004 Funada ....................... 700/245

FOREIGN PATENT DOCUMENTS

| JP | 11-143849 | | 5/1999 |
|---|---|---|---|
| JP | 2001-129787 | | 5/2001 |
| JP | 2001129787 A | * | 5/2001 |
| JP | 2001-191279 | | 7/2001 |
| JP | 2001-212782 | | 8/2001 |
| JP | 2002-120182 | | 4/2002 |
| JP | 2002-160185 | | 6/2002 |
| JP | 2002-163631 | | 6/2002 |
| JP | 2002-307350 | | 10/2002 |
| JP | 2002-337075 | | 11/2002 |
| JP | 2003-39363 | | 2/2003 |

OTHER PUBLICATIONS

Swinson, M.L.; Bruemmer, D.J. "Expanding frontiers of humanoid robotics." Jul./Aug. 2000. Intelligent Systems and Their Applications, IEEE. vol. 15, Issue: 4.*
Wullschleger, Felix H.; Brega, Roberto. "The Paradox of Service Robots." Oct. 2002. International Conference on Intelligent Robots and Systems, Proceedings of the 2002 IEEE/RSJ, EPFL, Lausanne, Switzerland. pp. 1126-1131.*

* cited by examiner

*Primary Examiner*—Khoi H. Tran
*Assistant Examiner*—Marie A Weiskopf
(74) *Attorney, Agent, or Firm*—Frommer Lawrence & Haug LLP; William S. Frommer; Thomas F. Presson

(57) ABSTRACT

A robot apparatus that is able to determine whether to ask a user for help, according to robot's situations. The robot apparatus determines based on an external or internal situation of the robot and its serious level whether to ask for help. When the robot apparatus decides to ask for help, it selects an action asking for help, according to the external or internal situation and the serious level, and takes the action.

8 Claims, 9 Drawing Sheets

| ID | INFORMATION FROM ACTION SELECTOR | IMPORTANT | ASKING ACTION |
|---|---|---|---|
| 1 | BLOCKED BY AN OBSTACLE | B | ASK A USER TO CLEAR THE OBSTACLE |
| 2 | BLOCKED BY AN OBSTACLE | B | ASK A USER TO MOVE ROBOT |
| 3 | LOW BATTERY | A | ENTER POWER SAVING MODE. SHOUT AT A USER WHEN FINDING HIM/HER. |
| 4 | LOW BATTERY | B | FIND A USER TO ASK FOR CHARGING |

|   | HELPING PERSON | COMBINATION ID |
|---|---|---|
| 1 | YOSHIDA | 1 |
| 2 | FUJITA | 4 |

FIG. 8

ROBOT APPARATUS AND CONTROL METHOD THEREOF

BACKGROUND OF THE INVENTION

1. Field of the Invention

This invention relates to a robot apparatus and a control method thereof, and more particularly, is suitably applied to an entertainment robot.

2. Description of the Related Art

Such a method has been proposed that enables robots to call for help when the robots have troubles. Please refer to a non-patent document ""Humanoid Robot ROBOVIE" Debut by Advanced Telecommunications Research Institute International (ATR) at Everyday Robot Consortium". Particularly refer to "Experiments on Human-Robot interactions", Jul. 7, 2000, ASCII24, Web site URL: http://ascii24.com/news/i/topi/article/2000/07/17/610214-000.html (originally in Japanese).

Robot, however, cannot follows its own will and gets in trouble easily. A user will find the robot boring if the robot asks for help every time when the robot gets in trouble, and a user will feel that the robot is unintelligent when the robot gets in the same trouble in the same situation.

To ask for help, the robot had better overact. However, overacting is a meaningless if nobody is around the robot. Especially the bad situation for a robot with a low battery is accelerated. Therefore, we have to develop a robot and a method for controlling the robot taking its surroundings into consideration when the robot asks for help to the user. With this smart control the user can feel that the robot is intelligent and entertainment properties of the robot are improved.

SUMMARY OF THE INVENTION

In view of the foregoing, an object of this invention is to provide a robot apparatus offering improved entertainment properties and a control method thereof. This robot apparatus comprises a determination means for determining whether to ask for help based on an external or internal situation recognized based on outputs from sensors and the serious level of the external or internal situation for the robot, and an asking action selection means for selecting and taking an action asking for help based on the external or internal situation and the serious level when the determination means decides to ask for help.

As a result, the robot apparatus may or may not ask for help based on the serious level of the external or internal situation for the robot even in a case where the same external or internal situation happens. This prevents a user from being disturbed often by the robot apparatus. Thus the robot apparatus can offer significantly improved entertainment property.

In addition, an object of this invention is to provide a control method of a robot apparatus. This control method comprises a first step of detecting an external or internal situation and determining whether to ask for help based on the external or internal situation and its serious level for the robot apparatus, and a second step of selecting an action asking for help based on the external or internal situation and the serious level for the robot and making the robot apparatus take the action.

As a result, the robot apparatus adopting this control method may or may not ask for help based on the serious level of the external or internal situation for the robot even in a case where the same external or internal situation happens. This prevents a user from being disturbed often by the robot apparatus. Thus the robot apparatus can offer significantly improved entertainment property.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 7 is a conceptual view showing an asking action database;

FIG. 8 is a conceptual view showing an asking action log; and

DETAILED DESCRIPTION OF THE EMBODIMENT

Preferred embodiments of this invention will be described with reference to the accompanying drawings:

(1) Construction of Robot of One Embodiment

Figure 1:
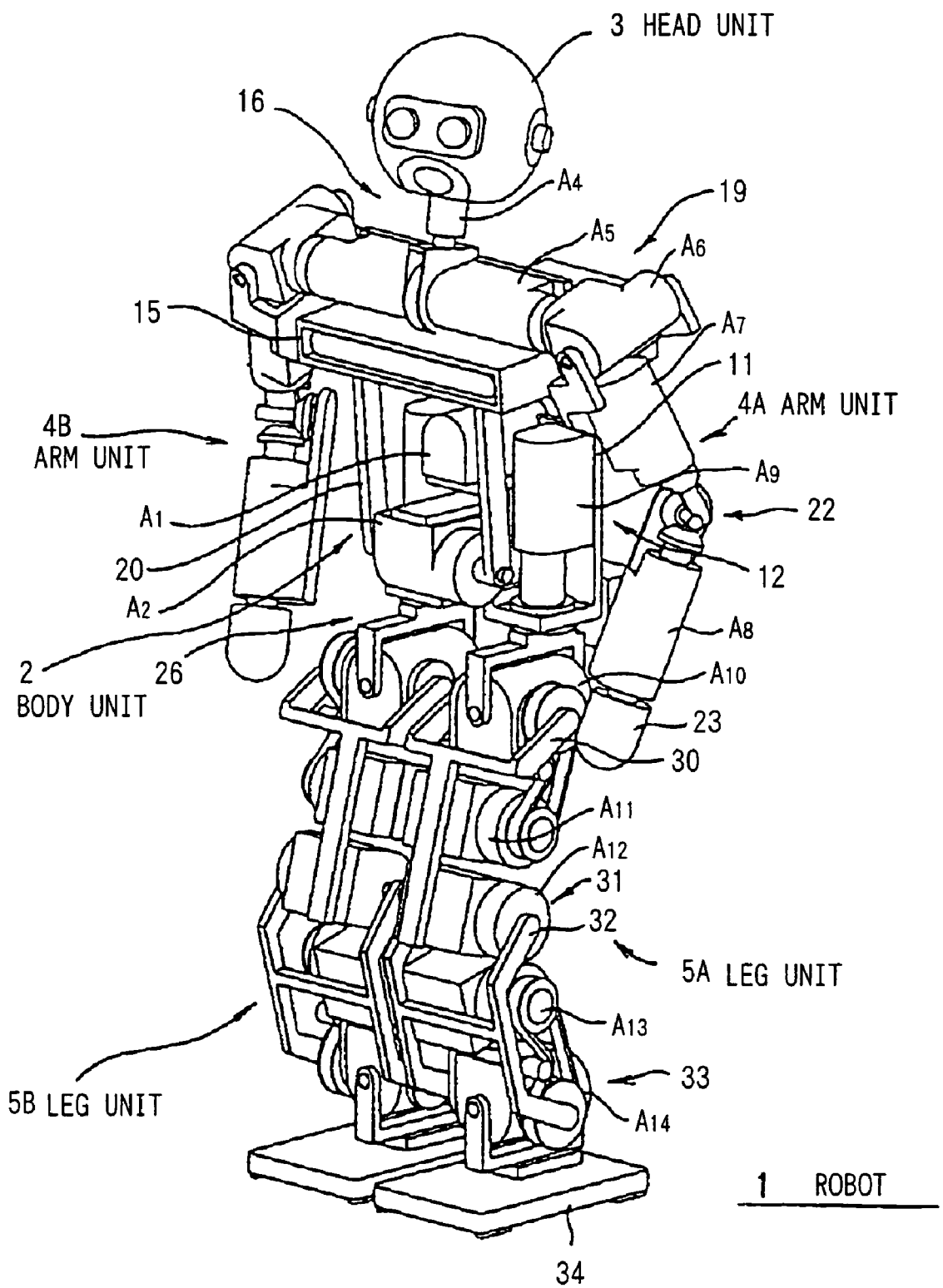
FIGS. 1 and 2 are perspective views showing an external form of a robot according to one embodiment of the present invention.
Figure 2:
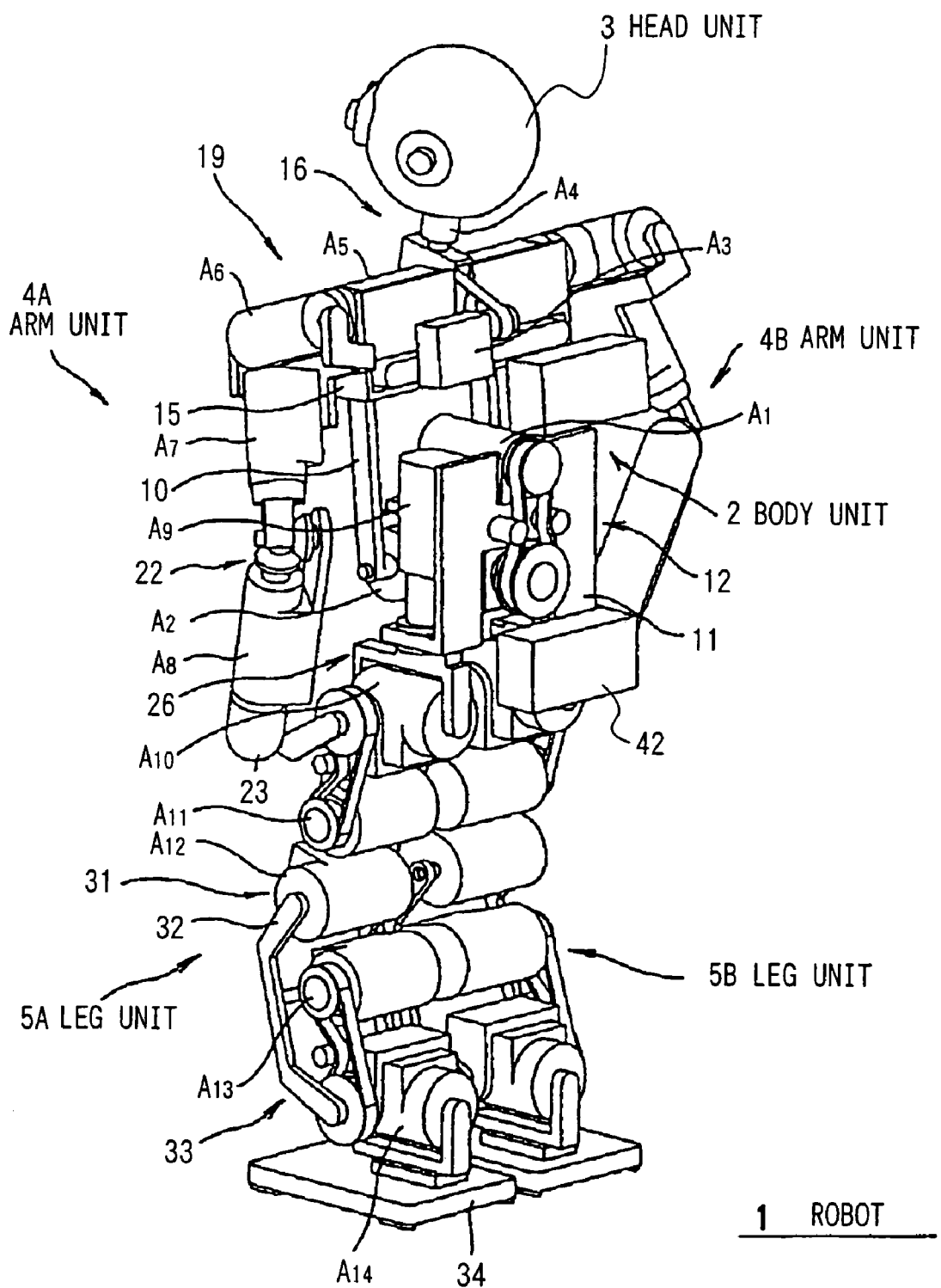

In FIG. 1 and FIG. 2, reference numeral 1 shows a two-legged walking robot according to this invention. As shown in these figures, the robot is composed of a body unit 2, a head unit 3, arm units 4A and 4B having the same construction, and leg units 5A and 5B having the same construction.

Figure 3:
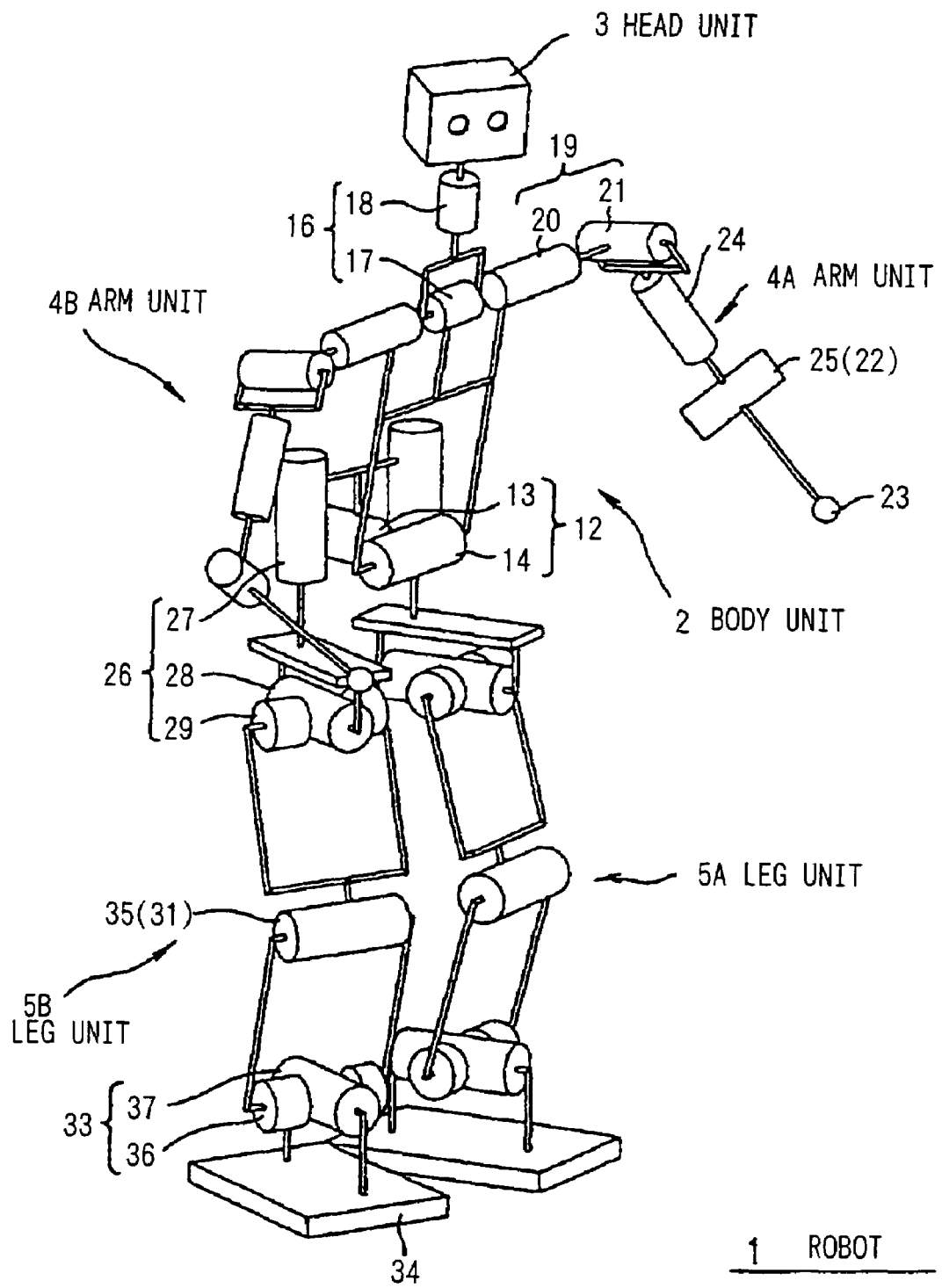
FIG. 3 is a conceptual view showing an external construction of the robot.

The body unit 2 is constructed of a frame 10 forming an upper body and a waist base 11 forming a lower body, both of which are connected to each other via a waist joint mechanism 12. By driving actuators $A_1$, $A_2$ of the waist joint mechanism 12, the upper body can be rotated independently around a roll axis 13 and a pitch axis 14 which are orthogonal to each other as shown in FIG. 3.

Also, the head unit 3 is attached on the center upper part of a shoulder base 15 fixed on the top of the frame 10, via a neck joint mechanism 16. By driving actuators $A_3$, $A_4$ of the neck joint mechanism 16, the head unit 3 can be rotated independently around a pitch axis 17 and a yaw axis 18 which are orthogonal to each other as shown in FIG. 3.

Furthermore, the arm units 4A and 4B are fixed onto the left and right of the shoulder base 15, respectively, via shoulder joint mechanisms 19. By driving actuators $A_5$ and $A_6$ of the shoulder joint mechanism 19, the arm unit 4A, 4B can be rotated independently around a pitch axis 20 and a roll axis 21 which are orthogonal to each other as shown in FIG. 3. In each arm unit 4A, 4B, the output axis of an actuator $A_7$ forming an upper arm is linked with an actuator $A_8$ forming a forearm via an elbow joint mechanism 22, and a hand unit 23 is attached to the distal end of the forearm. The forearm can be rotated around a yaw axis 24 shown in FIG. 3 by driving the actuator $A_7$, and around a pitch axis 25 by driving the actuator $A_8$.

Each leg unit 5A, 5B is attached to the waist base 11 via a hip joint mechanism 26. By driving actuators $A_9$-$A_{11}$ of the hip joint mechanism 26, each leg unit 5A, 5B can be rotated independently around a yaw axis 27, roll axis 28, and a pitch axis 29 which are orthogonal to one another as shown in FIG. 3. In each leg unit 5A, 5B, a frame 32 forming the lower leg is linked to the low end of the frame 30 forming the femoral region via a knee joint mechanism 31, and a foot unit 34 is linked with the low end of the frame 32 via an ankle joint mechanism 33. Therefore, the lower leg can be rotated around a pitch axis 35 shown in FIG. 3 by driving an actuator $A_{12}$ of the knee joint mechanism 31. The foot unit 34 can be rotated independently around a pitch axis 36 and a roll axis 37 which are orthogonal to each other as shown in FIG. 3, by driving the actuators $A_{13}$ and $A_{14}$ of the ankle joint mechanism 33.

Figure 4:
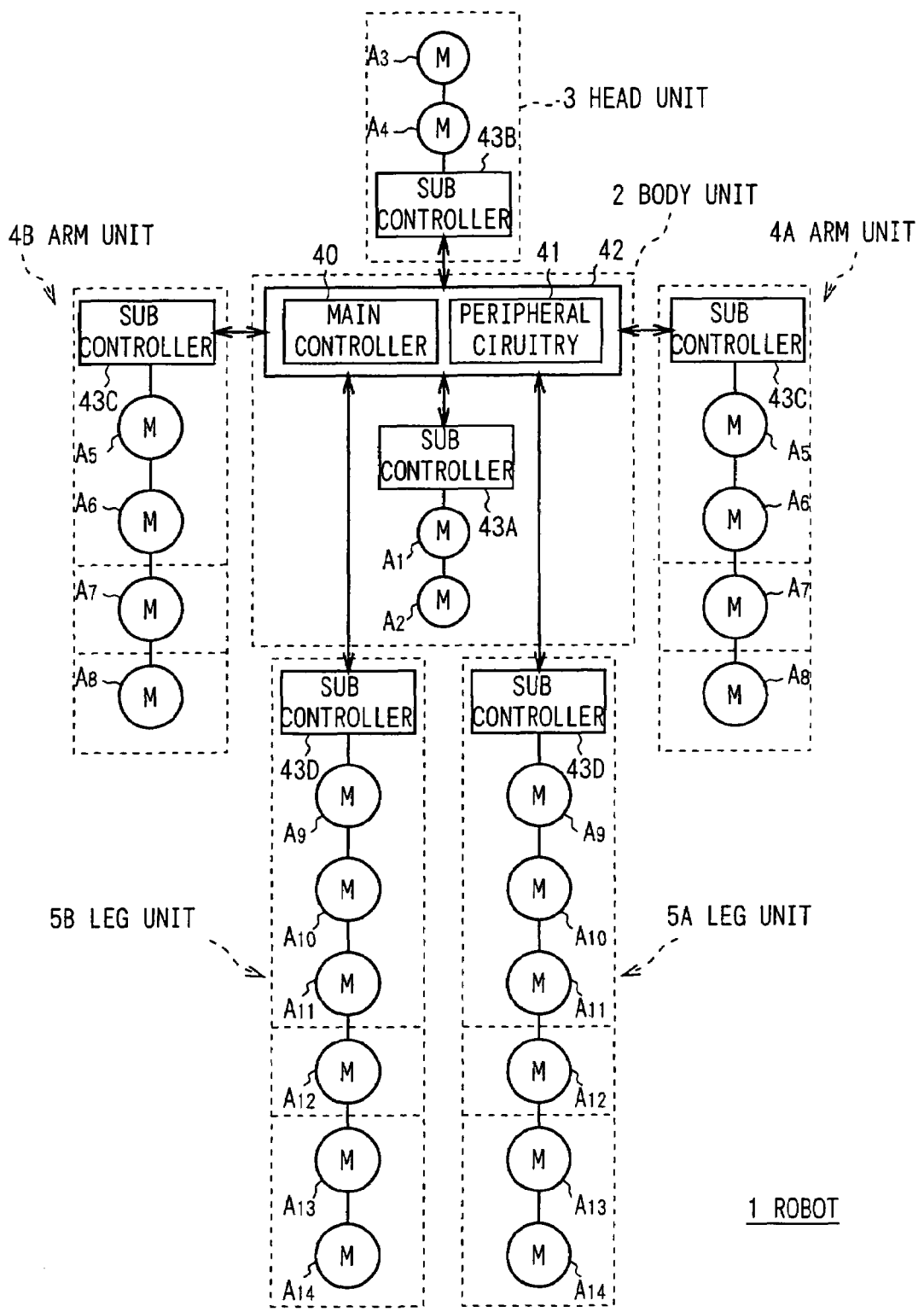
FIG. 4 is a conceptual view showing an internal construction of the robot.
Figure 5:
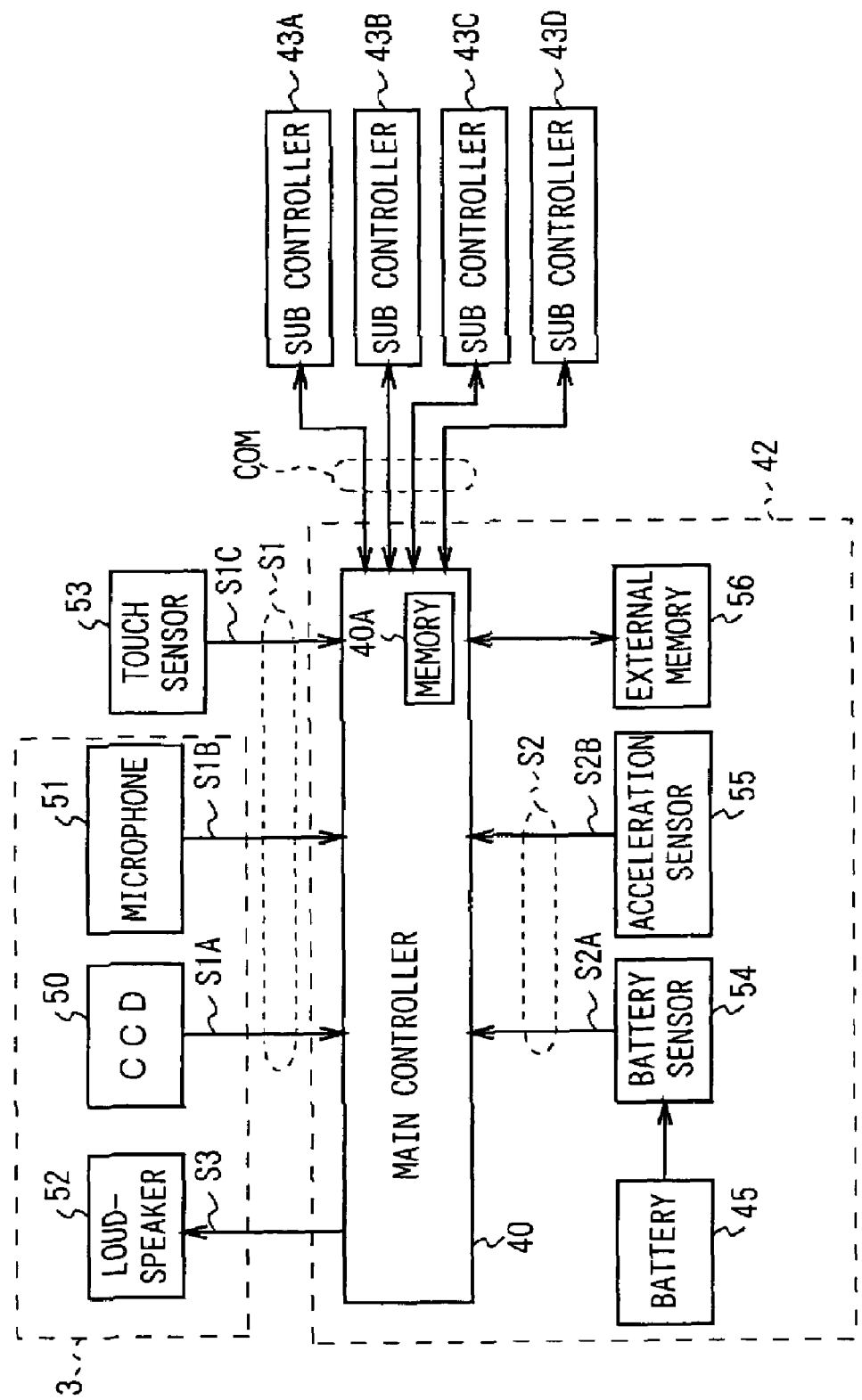
FIG. 5 is a block diagram explaining the internal construction of the robot.

Referring to FIG. 4, on the back of the waist base 11, is arranged a box of a control unit 42 which contains a main controller 40 for controlling the entire operation of the robot 1, peripheral circuitry 41 including a power circuit and communication circuit and a battery 45 (FIG. 5).

This control unit 42 is connected to sub controllers 43A-43D arranged within respective constituent units (body unit 2, head unit 3, arm units 4A and 4B, and leg units 5A and 5B), so as to supply necessary power voltages to the sub controllers 43A to 43D and to communicate therewith.

Connected to corresponding actuators $A_1$-$A_{14}$ of the constituent units, each sub controller 43A-43D is designed to be able to drive the corresponding actuators $A_1$-$A_{14}$ in a manner specified by various commands given from the main controller 40.

Referring now to FIG. 5, at predetermined positions on the head unit 3 are arranged external sensors such as a Charge Coupled Device (CCD) camera 50 functioning as "eyes" of the robot 1, and a microphone 51 as "ears", and a loudspeaker 52 as a "mouth". On each bottom of hand units 23 and foot units 34 is arranged a touch sensor 53 as an external sensor. In addition, inside the control unit 42 are arranged internal sensors including a battery sensor 54 and an acceleration sensor 55.

The CCD camera 50 captures surrounding environment and sends a captured video signal S1A to the main controller 40. The microphone 51 collects external sounds and sends an obtained audio signal S1B to the main controller 40. The touch sensor 53 detects physical pressures from a user and physical contacts with the outside, and sends a detection result to the main controller 40 as a pressure signal S1C.

The battery sensor 54 periodically detects an energy level of the battery 45, and sends the detection result to the main controller 40 as a battery level signal S2A. The acceleration sensor 56 periodically detects acceleration in three axes (x-axis, y-axis, and z-axis), and sends the detection result to the main controller 40 as an acceleration signal S2B.

The main controller 40 detects various robot's situations based on the video signal S1A, the audio signal S1B, the pressure signal S1C, etc. being external sensors' outputs, and the battery level signal S2A, the acceleration signal S2B, etc. being internal sensors' outputs.

Then the main controller 40 determines a subsequent action based on the detected situations, a control program being stored in an internal memory 40A, and various control parameters being stored in an external memory 58 being installed, and sends control commands based on the determined action to relevant sub controllers 43A-43D. As a result, the corresponding actuators $A_1$-$A_{14}$ are set in motion based on the control commands and under the control of the sub controllers 43A-43D, thus letting the robot 1 take action, such as moving the head unit 3 up and down, left to right, raising the arm units 4A and 4B, and walking.

In addition, the main controller 40 recognizes user's conversation through an speech recognition process of the audio signal S1B, gives an audio signal S3 corresponding to the recognition to the loudspeaker 52, resulting in output of synthesized sounds for communication with a user.

Thus the robot 1 is capable of behaving autonomously based on surrounding and internal situations, and also of communicating with the user.

(2) A Process of Main Controller 40 in Action Generation

Figure 6:
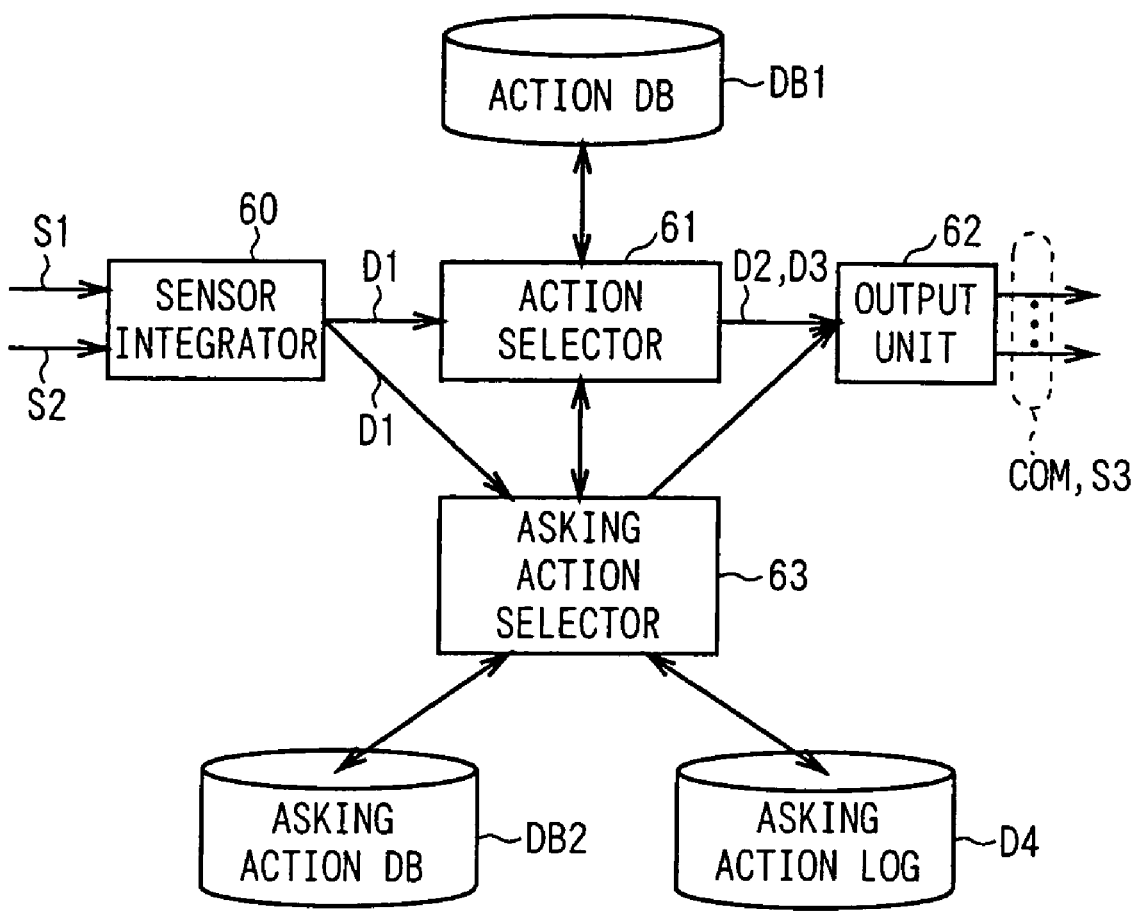
FIG. 6 is a block diagram explaining a process of a main controller in action generation.

Referring to FIG. 6, a process of the main controller 40 in the action generation is functionally divided into a sensor integrator 60, an action selector 61, an output unit 62, and an asking action selector 63. The sensor integrator 60 recognizes and spatially and temporally integrates external and internal situations based on the external and internal sensor signals S1 and S2, thereby creating sensor information D1. The action selector 61 selects a next action based on the sensor information D1 and makes the robot 1 takes the action. The output unit 62 outputs commands and speech data from the action selector 61 to relevant actuators $A_1$ to $A_{14}$ and the loudspeaker 52. The asking action selector 63 selects an optimal action when the robot 1 requires user help, and makes the robot 1 takes the action.

The sensor integrator 60 is provided with various recognizers (not shown) including color and face recognizers for recognizing colors and faces in an image based on a video signal S1A (FIG. 5), a speaker recognizer for recognizing a communication partner based on the audio signal S1B, and a sound direction recognizer for detecting where sounds come from.

Assume that the face recognizer and the color recognizer detect "a face with a face identification (hereinafter, referred to as FID) No. ○○" and "skin color", respectively, at the same position in the image based on a video signal S1A. Then the sensor integrator 60 creates sensor information D1 indicating that there is a user having a FID No. ○○, by integrating these recognition results, and sends it to the action selector 61 and the asking action selector 63. In addition to the above results, when the sound direction recognizer detects a direction from which sounds came, the sensor integrator 60 creates sensor information D1 by integrating these three recognition results and sends it to the action selector 61 and the asking action selector 63. At this time, the sensor integrator 60 also sends the sensor signals S1 and S2 to the selectors 61 and 63.

The action selector 61 selects a next robot action based on the sensor information D1, the external sensor signal S1 and the internal sensor signal S2, and makes the robot 1 take the action.

As a means for selecting a next action, the external memory 56 (FIG. 5) has an action database DB1 composed of action models and various detailed-action files. The action models show what action the robot 1 should take following robot's current action in what situation. The detailed-action files include a motion file and a sound file. The motion file shows, for each action, what actuators $A_1$ to $A_{14}$ should be moved, and when and how much they should be moved. The sound file stores audio data for sounds that the robot 1 makes when acting.

The action selector 61 selects a next robot action by reference to the action database DB1 when receiving sensor information D1, when detecting a prescribed robot situation based on external and internal sensor signals S1 and S2, or when a prescribed time has passed since the robot started the current action, and retrieves and executes the corresponding detailed-action files, thereby outputting commands D2 for relevant actuators $A_1$ to $A_{14}$ and audio data D3 to the output unit 62.

The output unit 62 gives the commands D2 as commands COM to the relevant actuators $A_1$ to $A_{14}$ via the relevant sub controllers 43A to 43D (FIG. 5), so that the robot 1 can take the selected action. In addition, the output unit 62 converts the received audio data D3 into analogs and outputs the resultant audio signal S3 to the loudspeaker 52 (FIG. 5), so as to output sounds based on the audio signal S3.

The action selector 61 always monitors robot situation based on sensor information D1, external and internal sensor signals S1 and S2 from the sensor integrator 60, to comprehensively determine based on the situation and its serious level whether the robot 1 requires user help. Note that the serious level indicates how serious the robot situation is for the robot itself.

For example, assume that the robot 1 detects an obstacle in front of the robot while an action for walking. If this situation is regarded as a low serious level (C), for example, when the robot 1 is walking without purpose, the action selector 61 decides "not to ask for help". If this situation is regarded as a high serious level (A or B), for example, when the robot 1 is walking with purpose, on the contrary, the action selector 61 decides "to ask for help".

As another example, assume that a battery level signal S2A (FIG. 5) from the battery sensor 54 indicates power still remains in the battery (serious level C). Then the action selector 61 determines that the battery does not necessarily have to be charged now and decides "not to ask for help". If less power remains (serious level B) or if the battery has to be charged immediately because no power remains (critical situation or serious level A), the action selector 61 determines that the battery has to be charged and decides "to ask for help".

When the action selector 61 decides "to ask for help", it stops the detailed-action files being executed, so that the robot 1 stops its current action. Then the action selector 61 informs the asking action selector 63 of the situation of this time (hereinafter, referred to as trouble situation) and the serious level of the trouble situation. The serious level indicates how serious the trouble situation is for the robot, and is determined based on the trouble situation, current action, battery level and so on.

If the action selector 61 detects a trouble situation of "little battery remains" and its serious level of "B" or "C", it informs the asking action selector 63 of the trouble situation (this notification is referred to as trouble notification) after the robot 1 finishes the current action, so that the robot 1 takes action to ask the user for help (hereinafter, referred to as asking action) after the current action finishes.

Since the asking action selector 63 has received the same sensor information D1, external and internal signals S1 and S2 as the action selector 61 from the sensor integrator 60, it is able to recognize robot's situations, for example, something in front of the robot 1 or a battery level. The asking action selector 63, however, cannot determine that the robot 1 is in trouble. By receiving a trouble notification from the action selector 61, the asking action selector 63 selects an optimal action and makes the robot take the action.

As a method for selecting an optimal action to a trouble situation, the external memory 56 (FIG. 5) has, for example, an asking action database DB2. This database is composed of a table shown in FIG. 7 and various detailed-asking-action files. The table represents one or plural asking actions for each combination of a trouble situation and its serious level. The combination is notified from the action selector 61. The detailed-asking-action files include a motion file and a sound file. The motion file represents, for each asking action, what actuators $A_1$ to $A_{14}$ should be moved and when and how much they should be moved. The sound file stores audio data of sounds that the robot 1 should make when acting.

In addition to the above databases DB1 and DB2, the external memory 56 stores an asking action log D4 as shown in FIG. 8. This log D4 shows the names of users who helped the robot 1 from trouble situations and identification IDs (hereinafter, referred to as combination IDS) 67 specified in the asking action database DB2 of FIG. 7, each representing a combination of a trouble situation and its serious level.

When the asking action selector 63 receives a trouble notification from the action selector 61, it detects by reference to the asking action log D4 whether any user have helped the robot 1 in the same trouble situation with the same serious level before. When no corresponding information is detected, the selector 63 searches the asking action database DB2 to select one of asking actions defined for a combination of the notified trouble situation and serious level.

Now assume that the robot 1 receives such a trouble notification that "an obstacle is blocking the robot 1" and its serious level is "B" from the action selector 61. As shown in FIG. 7, there are two choices for an asking action to this trouble situation: "ask a user to clear the obstacle"; and "ask a user to move me (the robot)". The asking action selector 63 selects one asking action out of the two.

When the asking action selector 63 selects an asking action, it retrieves and executes the detailed-asking-action files corresponding to the selected action from the asking action database DB2, thereby sending appropriate commands and audio data to the output unit 62. As a result, the robot 1 can take the action while outputting sounds, for example, "Clear the obstacle" or "Charge the battery".

At this time, the asking action selector 63 monitors sensor information D1, external and internal sensor signals S1 and S2 received from the sensor integrator 60 to detect that the trouble situation has been eliminated (or improved). If the situation has not been improved, the asking action selector 63 repeats the above process with changing the asking action to another every prescribed time.

When the asking action selector 63 detects that the trouble situation has been improved and when the robot 1 has stored information on the user who helped the robot 1, for example, his/her name, FID and speaker identification (SID), the asking action selector 63 retrieves the user name based on the FID and the SID detected from the sensor information D1 and updates the asking action log D4 by relating and storing the user name to a combination ID 64 representing the trouble situation and its serious level. At this time, the asking action selector 63 stops the asking action by stopping the detailed-asking-action files being executed, and notifies the action selector 61 that the trouble situation has been improved (hereinafter, this notification is referred to as improvement notification). Upon reception of this notification, the action selector 61 resumes the pending execution of the detailed-action files, thereby making the robot 1 take a next action.

Assume now that the asking action selector 63 detects a user who has helped the robot 1 from the same trouble situation with the same serious level before. Then the asking action selector 63 retrieves and executes the detailed-asking-action files corresponding to the combination ID from the asking action database DB2, so as to send commands D2 for relevant actuators $A_1$ to $A_{14}$ and audio data D3 to the output unit 62. In addition, the selector 63 creates audio data to specify the user and sends it to the output unit 62. As a result, the robot 1 takes the same action as before, and says "Mr. OO, clear the obstacle", or "Mr. OO, charge the battery", appointing the user. After a while, if the asking action selector 63 detects based on sensor information D1 and external and internal sensor signals S1 and S2 that the trouble situation has not been improved, it changes the user to another user, if any, who also helped the robot 1 from the same trouble situation with the same serious level before by searching the asking action log D4, and repeats the above process.

If the trouble situation still is not improved, the asking action selector 63 selects one out of the asking actions defined for the same trouble situation with the same serious level in the asking action database DB2, retrieves and executes the corresponding detailed-asking-action files from the asking action database DB2. After that, the selector 63 repeatedly changes and takes asking actions until the trouble situation is improved.

When the asking action selector 63 detects based on sensor information D1 and external and internal sensor signals S1 and S2 that the trouble situation has been improved, the selector 63 updates the asking action log D4 by relating and storing the name of the user who helped the robot 1 to the combination ID.

After that, the asking action selector 63 stops the asking action by stopping the detailed-action files being executed, and makes an improvement notification to the action selector 61. Upon reception of this notification, the action selector 61 resumes the pending execution of the detailed-action files, so that the robot 1 takes a next action.

In this method described above, the robot 1 is able to efficiently ask a user for help based on a memory of being helped by users.

In a case of a trouble situation with a serious level "A", such as, no power in the battery, the robot 1 expresses the emergency situation, speaking "Charge the battery" louder than usual with a quicker action. If the trouble situation is not improved for a predetermined time, the robot 1 sits to adjust the gains of the actuators $A_1$ to $A_{14}$ and suppress the energy consumption while improving the sensitivity of the external sensors such as the CCD camera 50 and the microphone 51 to detect a user. When the robot 1 detects a user, the robot 1 is arranged to speak louder than usual for asking for help in a short time. By doing so, the robot 1 is able to delay the progress of the trouble situation, resulting in reducing a probability in which the battery runs out.

(3) Asking Action Selection Process

Figure 9:
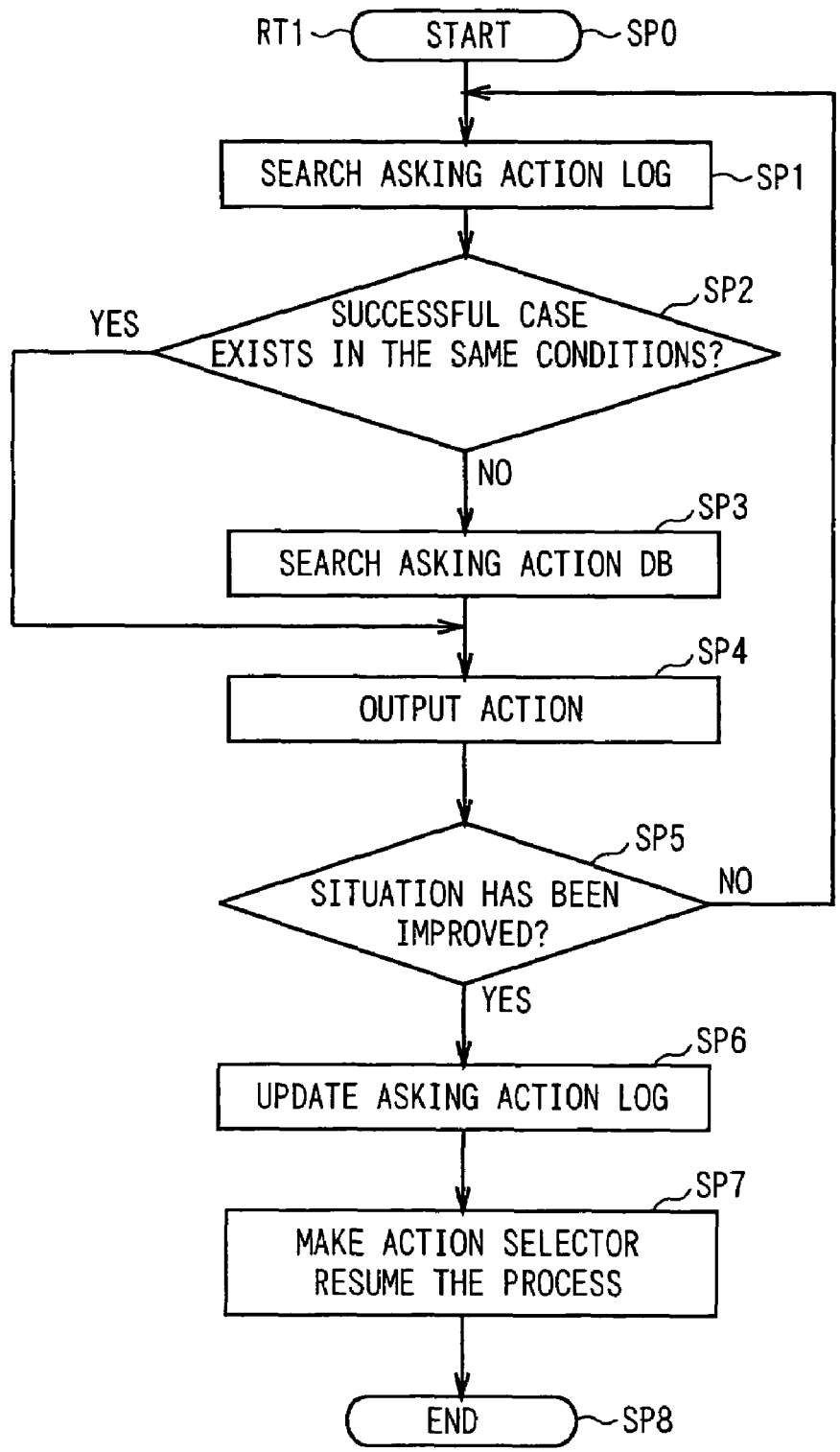
FIG. 9 is a flowchart showing a procedure of an asking action selection process.

The asking action selector 63 performs a procedure RT1 of an asking action selection process in FIG. 9, so as to ask a user for help when the robot 1 gets in trouble.

The asking action selector 63 starts this procedure RT1 when receiving a trouble notification from the action selector 61. At steps SP1 and SP2, the selector 63 determines based on the asking action log D4 whether any user has helped the robot 1 from the same trouble situation with the same serious level.

When a negative result is obtained at step SP2, the asking action selector 63 searches the asking action database DB2 and selects an asking action. Then at step SP3, it extracts and executes the corresponding detailed-asking-action files from the asking action database DB2, thereby outputting commands D2 for the relevant actuators $A_1$ to $A_{14}$ and audio data D3 to the output unit 62.

When a positive result is obtained at step SP2, on the contrary, the asking action selector 63 extracts and executes the detailed-asking-action files for the corresponding combination ID from the asking action database DB2, thereby outputting commands D2 for the relevant actuators $A_1$ to $A_{14}$ and audio data D3 to the output unit 62. In addition, the selector 63 creates audio data to specify the user and sends it to the output unit 62.

At step SP5 the asking action selector 63 detects based on sensor information D1 and external and internal sensor signals S1 and S2 received from the sensor integrator 60 whether the trouble situation has been improved. When a negative result is obtained, the process returns back to step SP1 and repeats the processes of step SP1 to step SP5 with changing the user to ask for help and the asking action at step 4 until a positive result is obtained at step SP5.

When a positive result is obtained at step SP5, the process proceeds to step SP6 in which the asking action selector 63 updates the asking action log by relating and storing the name of the user who helped the robot from the trouble situation to the combination ID 64 (FIG. 7).

At step SP7, the asking action selector 63 stops the detailed-asking-action files being executed, to stop the asking action, sends the action selector 61 an improvement notification, and proceeds to step SP8 where this procedure RT1 ends.

(4) Operation and Effects of this Invention

According to this invention, the robot 1 recognizes an external or internal situation based on outputs from external sensors such as the CCD camera 50 and the microphone 51 and internal sensors such as the battery sensor 54 and the acceleration sensor 55, and determines based on the external or internal situation and its serious level for the robot 1 whether to ask for help, and when the robot 1 decides to ask for help, selects and takes an asking action based on the external or internal situation and its serious level.

Therefore, for example, even an obstacle is blocking the robot 1 walking, the robot 1 does not ask for help if this situation is not so serious for the robot. Thus the user can be prevented from being often disturbed by the robot 1.

Further, even in a case where the same external or internal situation happens, the robot 1 does not ask a user for help if the robot 1 finds the serious level of the situation low for the robot 1, and the robot 1 selects and takes an asking action based on the external or internal situation and its serious level if the serious level of the situation is high. Thus the user can feel that the robot is intelligent as compared with conventional robots that ask users for help in the same way in a same situation.

Still further, the robot 1 stores the names of users who helped the robot 1 in the past, the external or internal situations and the serious levels of that time as an asking action log. When the robot 1 asks a user for help, the robot 1 appoints the same user and takes the same asking actions as before in the same trouble situation with the same serious level, based on the asking action log. As a result, the robot can effectively ask the user for help.

Still further, in a case where the robot 1 almost runs out of battery, the robot can change its mode so as to save the battery when nobody charges the battery after asking for help. As a result, the battery can last longer effectively.

According to this invention, the robot recognizes an external or internal situation based on outputs from external sensors and internal sensors, determines based on the external or internal situation and the serious level of the external or internal situation for the robot whether to ask for help, and selects and takes an asking action based on the external or internal situation and the serious level when the robot decides to ask for help. This is capable of preventing a user from being often disturbed by the robot. Thus the robot is able to offer significantly improved entertainment properties.

(5) Other Embodiments

In this embodiment described above, this invention is applied to a two-legged walking entertainment robot 1 shown in FIG. 1 to FIG. 5. This invention, however, is not limited to this and widely applied to various robot apparatuses.

Further, in this embodiment described above, the CCD camera 50, the microphone 51, the touch sensor 53, the battery sensor 54, the acceleration sensor 55 and potentiometers corresponding to the actuators $A_1$ to $A_{14}$ are applied as sensor means for detecting external and internal situations. This invention, however, is not limited to this and various sensor means for detecting other external and internal situations can be applied.

Still further, in this embodiment described above, the action selector 61 serving as a determination means for determining based on an external or internal situation recognized based on outputs from external sensors such as the CCD camera 50 and internal sensors such as the battery sensor 54 and the serious level of the external or internal situation for the robot whether to ask for help uses three levels "A", "B", and "C" as the serious level. This invention, however, is not limited to this and the serious level can have two, four, or more levels.

Still further, the asking action selector 63 serving as an asking action selection means stores asking actions and the names of users who helped the robot from trouble situations as a log of only successful cases (asking action log in this embodiment) in the external memory 56 serving as a storage means. This invention, however, is not limited to this and the asking action selector 63 can store a log of failed cases in the external memory 56 and select an asking action by reference to this log as well as the log of successful cases.

Still further, the external memory 56 serving as a storage means is applied for storing the action database DB1, the asking action database DB2, and the asking action log D4. This invention is not limited to this and storage means other than this memory, such as disc recording media, can be widely used.

Still further, a situation where the battery is running out soon is applied as a critical situation with a high serious level in the embodiment described above. This invention, however, is not limited to this and such situation can be applied that a component of the robot 1 is broken. In this case, the robot 1 may change its mode so as not to use the component, resulting in delaying the progress of this critical situation. That is, this invention is widely applied to other critical situations.

Still further, in this embodiment, the robot 1 takes the same asking action as before in the same situation with the same serious level. This invention, however, is not limited to this and the robot 1 can change asking actions one after another. Then by detecting which asking action is most effective for each situation, the robot can take the most effective asking action in the same situation thereafter.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A robot apparatus comprising:
   sensor means for detecting an external or internal situation;
   determination means for determining as a function of said external or internal situation and a corresponding serious level of the external or internal situation whether to ask for help,
   wherein the serious level indicates how serious the external or internal situation is for the robot itself; and
   asking action selection means for selecting an action asking for help based on said external or internal situation and said serious level and making said robot apparatus take the action when said determination means decides to ask for help,
   wherein the name of a user who interacts with the robot is retrieved based on a face identification and speaker identification of the user and is stored to a combination ID representing at least the serious level and the external or internal situation.

2. The robot apparatus according to claim 1, wherein
   said asking action selection means selects another action asking for help and makes said robot apparatus take the action when said external or internal situation is not improved after asking for help.

3. The robot apparatus according to claim 1, wherein,
   in a case where said external or internal situation is a critical situation with a high serious level, said asking action selection means changes a robot mode so as to delay progress of the critical situation when the external or internal situation is not improved after asking for help.

4. The robot apparatus according to claim 1, further comprising storage means for storing a log of past actions asking for help and their results, wherein
   said asking action selection means selects said action asking for help based on said external or internal situation and said serious level by reference to the log being stored in said storage means and makes said robot apparatus take the action when said determination means decides to ask for help.

5. A control method of a robot apparatus comprising:
   a first step of detecting an external or internal situation and determining as a function of the external or internal situation and a corresponding serious level of the external or internal situation whether to ask for help,
   wherein the serious level indicates how serious the external or internal situation is for the robot itself; and
   a second step of selecting an action asking for help based on said external or internal situation and said serious level and making said robot apparatus take the action when said determination means decides to ask for help,
   wherein the name of a user who interacts with the robot is retrieved based on a face identification and speaker identification of the user and is stored to a combination ID representing at least the serious level and the external or internal situation.

6. The control method according to claim 5, further comprising
   a third step of selecting another action asking for help and making said robot apparatus take the action when the external or internal situation is not improved after asking for help.

7. The control method according to claims 5, wherein,
   in a case where said external or internal situation is a critical situation with a high serious level, said second step changes a robot mode so as to delay progress of the critical situation when the external or internal situation is not improved after asking for help.

8. The control method according to claim 5, further comprising
   a fourth step of storing a log of past actions asking for help and their results, wherein
   said second step selects an action asking for help based on said external or internal situation and said serious level by reference to said log and makes said robot apparatus take the action.

* * * * *